(12) United States Patent
Melody et al.

(10) Patent No.: US 6,721,169 B2
(45) Date of Patent: Apr. 13, 2004

(54) ELECTROLYTIC CAPACITOR AND SEPARATOR PAPERS THEREFOR

(75) Inventors: Brian John Melody, Greer, SC (US); John Tony Kinard, Greer, SC (US); Guy Cornelius Scibenas Van Natta, Jr., Simpsonville, SC (US); Albert Kennedy Harrington, Fountain Inn, SC (US); David Alexander Wheeler, Williamston, SC (US)

(73) Assignee: Kemet Electronics Corporation, Greenville, SC (US)

( * ) Notice: Subject to any disclaimer, the term of this patent is extended or adjusted under 35 U.S.C. 154(b) by 107 days.

(21) Appl. No.: 10/173,593

(22) Filed: Jun. 19, 2002

(65) Prior Publication Data

US 2003/0235024 A1 Dec. 25, 2003

(51) Int. Cl.$^7$ .................................... H01G 9/02
(52) U.S. Cl. .................. 361/512; 205/234; 429/229; 204/28
(58) Field of Search ................... 361/512, 511, 361/502; 429/229; 205/234; 204/28

(56) References Cited

U.S. PATENT DOCUMENTS

| 4,463,075 | A | * | 7/1984 | Fritsch et al. .................. 430/23 |
| 5,364,715 | A | * | 11/1994 | Getz et al. .................. 429/229 |
| 5,464,709 | A | * | 11/1995 | Getz et al. .................. 429/229 |

* cited by examiner

Primary Examiner—Anthony Dinkins
(74) Attorney, Agent, or Firm—Banner & Witcoff Ltd.

(57) ABSTRACT

Separator paper comprising paper impregnated with soluble silicate. The soluble silicate may be applied to the separator paper by immersing the paper into an aqueous solution of the soluble silicate or by spraying with an aqueous solution of the soluble silicate. In a preferred embodiment, the soluble silicate is sodium silicate. An electrolytic capacitor comprising an electrolytic solution, at least one anode foil, at least one cathode foil, and separator paper between the at least one anode foil and at least one cathode foil, wherein the separator paper comprises paper impregnated with a soluble silicate.

16 Claims, No Drawings

ELECTROLYTIC CAPACITOR AND SEPARATOR PAPERS THEREFOR

FIELD OF THE INVENTION

The invention relates to electrolytic capacitors and the use of separator papers therein.

BACKGROUND OF THE INVENTION

The "working" or "fill" electrolyte solutions contained within aluminum electrolytic capacitors generally contain a small amount of water due to contact with the atmosphere and to absorption of water from the separator papers used to prevent contact between anode and cathode foils. Electrolyte solutions for use in higher voltage aluminum electrolytic capacitors may contain 2 to 5% or more of water intentionally added to the electrolyte for the purpose of facilitating the repair of the anodic oxide film on the anode foil and for the purpose of reducing the electrolyte resistivity.

The water present in the "fill" electrolyte may react with the cathode foil at elevated temperatures, both during use and while the devices are standing idle. The water present in the electrolyte may also attack the anode foil while the devices stand idle (i.e., un-electrified) at elevated temperature. The reaction with water contained in the working electrolyte produces a bulky reaction product on the cathode foil, which reduces device capacitance, increases device ESR and dissipation factor, and may rupture the seals of the devices due to the liberation of hydrogen gas by the reaction. The reaction of the water contained in the working electrolyte with the anodic oxide (while standing un-electrified at elevated temperature) increases the leakage current and dissipation factor of the devices.

For many years relatively small amounts (i.e., 50 ppm to 0.5%) of soluble orthophosphate salts have been included in working electrolyte formulations for aluminum electrolytic capacitors for the purpose of maintaining a passive, hydration resistant surface on both the anode and cathode foils of these devices. The orthophosphate absorbs onto and reacts with the surfaces of the anode and cathode foils, rendering these surfaces much less reactive with the moisture contained in the working electrolyte.

Orthophosphate contained in the working electrolyte in aluminum electrolytic capacitors tends to concentrate adjacent to the anodic oxide surfaces during electrification of the device. At higher operating voltages the concentration of orthophosphate may occur to a sufficient extent to significantly reduce the pH of the solution adjacent to the anodic oxide. If the concentration of phosphate is sufficient high, the oxide electrical resistance is compromised (probably due to the low pH and local oxide dissolution) and the devices fail due to short-circuiting of the anodic oxide dielectric. The occurrence of device short-circuiting due to the presence of excessive amounts of phosphate adjacent to the anodic oxide during device electrification has led capacitor manufacturers to include very small levels of phosphate in electrolytes for higher operating voltage capacitors or even to eliminate orthophosphate altogether from high voltage working electrolytes. The reduced level or elimination of phosphate from high voltage working electrolytes tends to render the devices susceptible to the hydration attack due to the water content of the electrolyte, as described above.

BRIEF SUMMARY OF THE INVENTION

The invention is directed to a separator paper comprising paper impregnated with soluble silicate. The soluble silicate may be applied to the separator paper by immersing the paper into an aqueous solution of the soluble silicate or by spraying with an aqueous solution of the soluble silicate. In a preferred embodiment, the soluble silicate is sodium silicate.

The invention is further directed to an electrolytic capacitor comprising an electrolytic solution, at least one anode foil, at least one cathode foil, and separator paper between the at least one anode foil and at least one cathode foil, wherein the separator paper comprises paper impregnated with a soluble silicate.

In a preferred embodiment, the at least one anode foil and at least one cathode foil are aluminum foil. The soluble silicate leaches from the paper to provide about 10 to about 5000 ppm silicate in the electrolytic solution.

DETAILED DESCRIPTION OF THE INVENTION

It was discovered that the inclusion of silicate ions in working electrolytes containing phosphate has the desirable effect of raising the sparking voltage of the working electrolyte when pre-anodized anode foil (such as is used in the fabrication of aluminum electrolytic capacitors) is electrified while in contact with the electrolyte. Furthermore, the silicate need only be present at very low levels to significantly increase the sparking voltage. A striking example of this phenomena is given in U.S. patent application Ser. No. 10/006,388, in which the inclusion of 50–100 ppm sodium silicate ($Na_2SiO_3$ $9H_2O$) in solution in a high-voltage working electrolyte based upon the polyester of 2-methyl,1,3-propane diol and boric acid and containing approximately 0.2 wt % orthophosphate raised the breakdown voltage to 800–850 volts, versus 300–400 volts without the addition of the silicate.

Unfortunately, silicates are quite unstable in neutral or acidic solutions and may exist as colloidal or semi-colloidal silica particles. During the process of capacitor cartridge impregnation, the passage of electrolyte through the separator papers between the foils may remove a large portion of the silicate/silica via filtration or chromatographic separation.

It was discovered that the silicate may be conveniently introduced into the electrolyte by impregnating the separator paper with a soluble silicate prior to winding of the capacitor cartridges. An excess of a silicate may be applied to the separator paper via immersion in, or spraying with, an aqueous solution of the silicate, followed by drying prior to take-up of the separator paper on a roll. The silicate is preferably sodium silicate. Other silicates include, but not limited to, potassium silicate. The aqueous solution preferably contains between about 0.1 wt % and 5 wt % silicate, more preferably between about 0.3 wt % and about 1 wt %.

The application of the silicate may be accomplished as a step in the papermaking process or as a separate step so long as it is accomplished prior to winding of the capacitor cartridges.

The impregnated separator paper is then inserted into an electrolytic capacitor. The electrolytic capacitor contains an electrolytic solution, at least one anode foil, at least one cathode foil, and the separator paper between the at least one anode foil and at least one cathode foil.

The anode foil and cathode foil are preferably aluminum foil. Other foils include, but are not limited to, tantalum, titanium, and niobium.

The electrolytic solution contains at least about 0.5 wt % water, preferably about 2 wt % to about 5 wt % water. Any suitable electrolytic solution may be used. For example, the electrolytic solution may contain ethylene glycol. Alternatively the electrolytic solution may contain a polyester product of 2-methyl,1,3-propanediol and boric acid The soluble silicate leaches from the paper to provide approximately about 10 to about 5000 ppm silicate, preferably about 50 to about 1000 ppm silicate in the electrolytic solution.

The silicate dissolves in the working electrolytic solution following impregnation of the wound capacitor cartridges with the working electrolytic solution, thereby raising the sparking voltage of phosphate-containing working electrolytic solutions.

EXAMPLE 1

This example illustrates the leaching of silicate from silicate-containing separator paper by working electrolytes and the resulting dissolution of the silicate by the working electrolyte exposed to the silicate-containing paper. Two samples of soft tissue paper of the type used adjacent to the anode foil in high voltage electrolytic capacitors, were dipped into a 1 wt % aqueous solution of sodium silicate. Excess solution was drained from the tissue samples and the samples were then dried at 50° C. in an oven atmosphere of dry nitrogen gas.

One sample of silicate-impregnated paper was placed in a flask with five (5) times its weight of ethylene glycol at room temperature for 20 minutes. The tissue was then pressed to remove a sample of the glycol (Sample A) for silicate analysis.

The other sample of silicate-impregnated paper was placed in a flask with five (5) times its weight of ethylene glycol and the flask along with its contents were heated to 85° C. for 15 minutes. The paper was then removed from the flask and was pressed to remove a sample of ethylene glycol (Sample B) for silicate analysis.

The analysis was calculated on the basis of silicon content of the electrolyte as indicated by ICP analysis of the solutions. Ethylene glycol was used in this test because it is currently the most widely used solvent in high voltage capacitor electrolyte compositions. Results are as follows:

Sample A: (25° C. Extraction)=290 ppm

Sample B: (85° C. Extraction)=1,0456 ppm

Thus the silicate, a beneficial component of high voltage electrolytic capacitor electrolytes, especially those containing phosphate, may be introduced into the working electrolyte composition by incorporation into the separator paper used to wind the capacitor cartridges.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A separator paper comprising paper impregnated with soluble silicate.

2. The separator paper of claim 1 wherein the soluble silicate is applied to the separator paper by immersing the paper into an aqueous solution of the soluble silicate.

3. The separator paper of claim 1 wherein the soluble silicate is applied to the separator paper by spraying with an aqueous solution of the soluble silicate.

4. The separator paper of claim 1 wherein the soluble silicate is applied to the paper during the papermaking process.

5. The separator paper of claim 1 wherein the soluble silicate is sodium silicate.

6. The separator paper of claim 2 wherein the aqueous solution contains between about 0.1 wt % and 5 wt % silicate.

7. The separator paper of claim 2 wherein the aqueous solution contains between about 0.3 wt % and 1 wt % silicate.

8. An electrolytic capacitor comprising an electrolytic solution, at least one anode foil, at least one cathode foil, and separator paper between the at least one anode foil and at least one cathode foil, wherein the separator paper comprises paper impregnated with a soluble silicate.

9. The electrolytic capacitor of claim 8 wherein the at least one anode foil and at least one cathode foil are aluminum foil.

10. The electrolytic capacitor of claim 8 wherein the electrolytic solution contains at least about 0.5 wt % water.

11. The electrolytic capacitor of claim 10 wherein the electrolytic solution contains about 2 wt % to about 5 wt % water.

12. The electrolytic capacitor of claim 8 wherein the soluble silicate leaches from the paper to provide about 10 to about 5000 ppm silicate in the electrolytic solution.

13. The electrolytic capacitor of claim 8 wherein the soluble silicate leaches from the paper to provide approximately about 50 to about 1000 ppm silicate in the electrolytic solution.

14. The electrolytic capacitor of claim 8 wherein the soluble silicate is sodium silicate.

15. The electrolytic capacitor of claim 8 wherein the electrolytic solution comprises ethylene glycol.

16. The electrolytic capacitor of claim 8 wherein the electrolytic solution comprises polyester product of 2-methyl,1,3-propanediol and boric acid.

* * * * *